United States Patent [19]

McIntosh et al.

[11] Patent Number: 4,716,637
[45] Date of Patent: Jan. 5, 1988

[54] SPREADER ROLL

[75] Inventors: Billy R. McIntosh, Salisbury; Thor R. Thisse, Linwood, both of N.C.

[73] Assignee: The B. F. Goodrich Company, Akron, Ohio

[21] Appl. No.: 403,177

[22] Filed: Jul. 29, 1982

[51] Int. Cl.[4] ................................................ B30B 3/00
[52] U.S. Cl. ........................................ 29/129; 29/130; 29/132
[58] Field of Search ................. 29/125, 130, 116 R, 29/124, 129, 132; 384/276, 297, DIG. 9, 418, 419, DIG. 8; 308/130, 187; 884/115

[56] References Cited

U.S. PATENT DOCUMENTS

| 2,547,975 | 4/1951 | Robertson | 29/116 R X |
| 2,568,056 | 9/1951 | Corder | 384/130 X |
| 2,582,280 | 1/1952 | Robertson | 29/116 R X |
| 2,942,841 | 6/1960 | Stillwagon | 384/130 X |
| 2,989,352 | 6/1961 | Schmidt | 384/297 X |
| 3,086,826 | 4/1963 | Gunnell | 384/418 |
| 3,443,845 | 5/1969 | Walchle et al. | 384/140 X |
| 4,043,622 | 8/1977 | Hotchkiss et al. | 29/116 R X |

FOREIGN PATENT DOCUMENTS 398479 9/1933 United Kingdom .................. 29/125

Primary Examiner—Mark Rosenbaum
Attorney, Agent, or Firm—Joseph Januszkiewicz

[57] ABSTRACT

A spreader roll that operates to convey flexible sheet material in its manufacture via a bowed shaft which supports a plurality of thermoplastic bearing units which are spaced laterally on the shaft by spacers to maintain a clearance space between sleeves in the bearing units. The end bearing units have sleeves and bearings therein that are sealed from external contaminants by a locking sleeve, an annular seal and end caps. A cylindrical sleeve encompasses all of the bearing units and is operative to contact the sheet material to be conveyed.

4 Claims, 2 Drawing Figures

U.S. Patent        Jan. 5, 1988        4,716,637
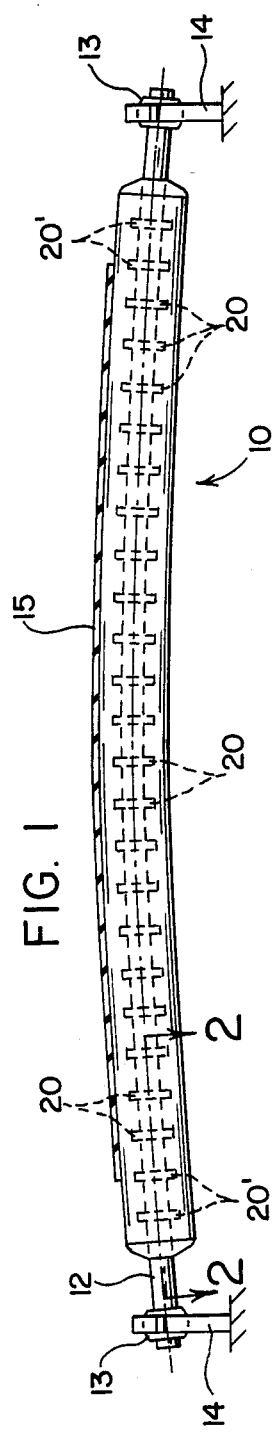
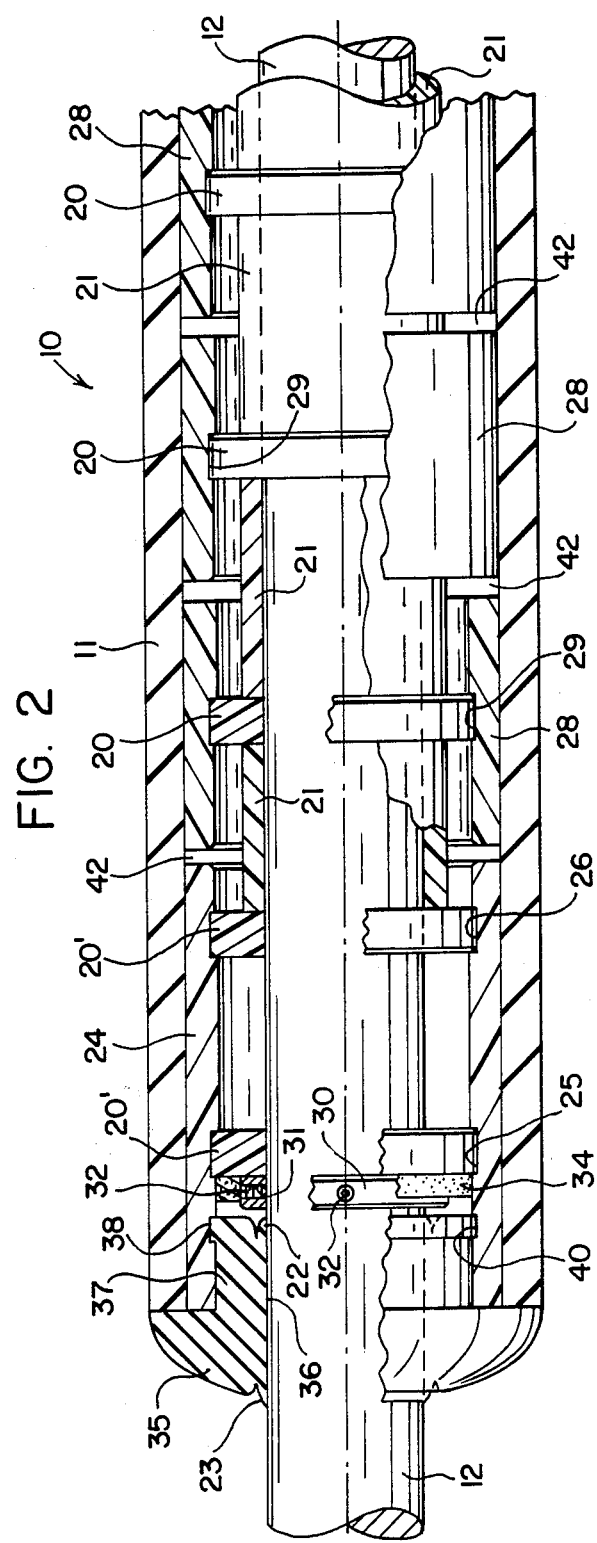

SPREADER ROLL

BACKGROUND OF THE INVENTION

This invention relates to a spreader roll and more particularly to a uniquely constructed bow or spreader roll which is used to support and transport sheet material.

In the support of thin flexible sheet material during its manufacture for processing, it is desirable to provide a bow roll support to remove wrinkles which normally occur in their processing when such material is drawn from the nip of one set of rolls and are conveyed to a second set of rolls. The present invention provides for the improvement in the handling of such sheet material by a unique construction spreader roll that is operative in a corrosive environment to effectively transport sheet material while assuring a wrinkle free delivery from the processing units and between separate stations of processing. Heretofore, failures occurred in the internal bearing units of the bow rolls and at times the failures were progressive such that difficulty was encountered in the transporting of the sheet material without associating the problem with the specific rolls themselves. The problems would arise in the internal bearings of the bow roll because of the precipitated vapors in and around the bearings. These precipitates within the bow rolls would occur as the rolls operate in an atmosphere containing varying degrees of chemicals. The heating and cooling of the rolls as well as the normal variations in barometric pressure through the cycle of the processing would permit moisture containing varying degrees of chemicals to enter the bearings and the vapor would condense into moisture thereafter leaving a concentrated residue of chemical crystals. These chemical accentuate the deterioration of the bow roll structure. The present invention utilizes a unique construction that prolongs the life of a bearing structure thereby assuring an extensive processing life to the transport units. This unique structure is economical to manufacture yet improves the reliability of the bow roll.

SUMMARY OF THE INVENTION

The present invention contemplates a spreader roll with an elongated shaft with a pre-set curvature having a plurality of axially disposed bearing units journaled on the shaft. Each bearing unit is composed of a thermoplastic sleeve with a groove on the inner periphery captively securing a thermoplastic bearing. The bearing units are separated by a plastic spacer to maintain a clearance space between adjacent sleeves. End caps and seals are positioned on the ends of the shaft with a cylindrical roller circumferentially encompassing all of the sleeves.

BRIEF DESCRIPTION

FIG. 1 is a front elevational view of a preferred embodiment of the invention.

FIG. 2 is an enlarged front elevational view of an end portion of a bow roll with a portion thereof in cross section.

DETAILED DESCRIPTION

Referring to the drawings, wherein like reference numerals designate like or corresponding parts throughout the several views, there is shown in FIG. 1 a spreader roll or bow roll 10, being an elongated roller with an outer elongated sleeve 11 made from a rubber material that is chemically resistant and operates in temperatures up to 210° F. The spreader roll 10 has a central longitudinally extending shaft 12 that extends outwardly beyond the terminal ends of roll 10 suitably connected to friction lock assemblies 13, which are secured to supporting stands 14, which stands 14 in turn can be mounted on a suitable frame to provide rigid spaced supports for the respective ends of the roll. The shaft 12 is a rigid metallic support having a pre-set radius or bow. The roll 10 supports a flexible sheet material 15 as seen in FIG. 1, which sheet material is being transported between processing rolls or other processing units.

In the construction of the spreader roll 10 a plurality of laterally spaced bearings 20 impregnated with a material such as molybdenum disulfide are journaled on the central shaft 12. Annular thermoplastic spacers or spacer sleeves 21 are mounted between all of the respective bearings 20 except the two respective end bearings 20' which are captively journaled on the shaft 12 by a rigid annular thermoplastic end segment or sleeve 24. The construction of the spreader roll 10 is the same across its entire length, however, only one of the end portions will be described, it being understood that the other end portion of roll 10 is similarly constructed with the one described. End segment or sleeve 24 has a pair of spaced grooves 25 and 26 on its inner peripheral surface which frictionally engages the outer periphery of the end bearing 20' to maintain the spacing therebetween. The bearings 20' are press fitted into grooves 25 and 26. The outer circumferential surface of end sleeve 24 is smooth. Encompassing each molybdenum disulfide bearing 20 is an annular thermoplastic segment or sleeve 28. Each sleeve 28 has a groove 29 on its inner periphery and a smooth outer circumferential surface that is coextensive with outer surface of end sleeve 24. The groove 29 in each sleeve 28 suitably captively engages one of the spaced bearings 20 to maintain the alignment thereof. Each sleeve 28 with its corresponding bearing 20 are spaced from adjacent sleeves 28 by the spacer sleeves or spacers 21 such as to leave a clearance space between adjacent sleeves 28 to compensate for any bow in the central shaft 12. Once all of the sleeves 28 and the spacers 21 are assembled on the shaft 12 followed by the assembling of end bearings 20' and sleeve 24, an annular collar 30 is then positioned against the outermost end bearing 20'. Each annular collar 30 is a locking collar and has a plurality of circumferentially spaced radially extending threaded bores 31 thereon. The respective threaded bores 31 receive a threaded locking screws 32 for securing the collars onto shaft 12. An annular seal 34 is then press fitted between the locking collar 30 and inner peripheral surface of end sleeve 24 such that seal 34 encompasses the locking collar 30 to ensure an internal pollution free environment for the bow roll 10. An end cap 35 with a hub 37 made of rubber has a central bore 36 that closely receives shaft 12 such that hub 37 with an annular abutment 38 thereon is captively secured by an annular groove 40 on the inner periphery of end sleeve 24. End cap 35 has molded into its respective peripheral edges adjacent the respective ends of central bore 36 or the respective entrances to central bore 36 spaced lips or seals 22 and 23. During the molding of such lips or seals 22 and 23, the respective inner diameters thereof are molded or proprotioned so that they have a smaller diameter than the central bore 36 to thereby mold into such lips 22 and 23 an inherent tendency to rip the shaft 12. Lip 22 is located adjacent the locking collar 30 and is referred to as the inner seal while lip 23 is referred to as the end cap's outer seal. With the molding of such inner and outer seals 22 and 23 respectively into the end cap 35, such inner and outer seals encompass the shaft 12 and cooperates with annular seal 34 to effectively block the penetration of liquids, vapors and chemicals to the internal portion of the sleeves, spacers and bearings. The flat annular shoulder formed between the hub 37 and the end cap 35 abuts the outer edge of end sleeve 24 and the lateral annular edge of elongated sleeve 11. The elongated outer sleeve 11 frictionally engages the outer circumferential surfaces of the end sleeve 24 and the annular sleeves 28. The respective thermoplastic portions of the spreader roll 10 including the bearing 20', 20, the spacers 21, the end sleeves 24, and the sleeves 28 are made from a chemically inert material such as nylon impregnated with molybdenum disulfide. The outer section of sleeve 11 is made from a flexible rubber compound. The chemically inert materials referred to above provide tensile strength approaching aluminum and provides an operating range upper limit of approximately 212° F. without any adverse effects of deformation or functional defects.

Prior to assembling the respective sleeves and bearings onto the central shaft 12, the bearings 20 are first press fitted into the respective sleeves 28, thereby making up a plurality of rotatable bearing units. The bearing units are then slid onto the shaft 12 with annular spacers 21 being inserted between such bearing units to provide a clearance space 42 between adjacent sleeves 28. End sleeves 24 and their end bearings 20' are then inserted over the respective ends of shaft 12, afterwhich the rubber outer sleeve 11 is assembled onto the axially aligned bearing units. By machining the respective length of the center sleeves 28 the overall length of the spreader roll 10 can be adjusted to the specific length required economically and conventiently. The annular locking collars 30 are positioned against the respective outermost end bearings 20' and locked in position. Annular seals 34 are then placed between the collar 30 and the inner periphery of end sleeve 24. End caps 35 are then slid onto shaft 12 and pressed into position whereby annular abutment 38 snaps into annular groove 40. The assembled bow roll is now ready for installation on the spaced friction lock assemblies 13 and the supporting stands 14.

Various modifications are contemplated and may obviously be resorted to by those skilled in the art without departing from the described invention, as hereinafter defined by the appended claims, as only a preferred embodiment thereof has been disclosed.

We claim:

1. In a bow roll for use in supporting flexible sheet material along its transverse length for transport wherein said roll has an elongated rigid shaft supported at its respective ends, as plurality of axially spaced thermoplastic annular rings supported on said shaft for rotation thereon, a plurality of laterally spaced thermoplastic sleeves having grooves on their inner periphery for captively securing said rings, thermoplastic annular spacers mounted on said shaft between said annular rings and operative to maintain a predetermined clearance space between said sleeves, a cyindrical rubber roller circumferentially encompassing all of said sleeves for rotation therewith and supported thereby for frictional contact with such sheet material for support and conveyance thereof, said rubber roller having annular ends, and elastomeric end caps with a central bore frictionally journaled on the respective ends of said shaft and abuttingly engages said annular ends of said cylindrical roller and certain ones of said sleeves to seal the ends thereof.

2. In a bow roll as set forth in claim 1 wherein said sleeves at the respective ends of said shaft have an inner peripheral groove that frictionally receives an annular abutment on said end cap.

3. In a bow roll as set forth in claim 2 wherein each of said end cap have annular lips that encompass said shaft and frictionally engage said shaft to seal vapor penetration within said bow roll.

4. In a bow roll for use in supporting flexible sheet material along its transverse length for transport wherein said roll has an elongated rigid shaft supported at its respective ends, a plurality of axially spaced thermoplastic annular rings supported on said shaft for rotation thereon, a plurality of laterally spaced thermoplastic sleeves having grooves on their inner periphery for captively securing said rings, thermoplastic annular spacers mounted on said shaft between said annular rings and operative to maintain a predetermined clearance space between said sleeves, a cylindrical rubber roller circumferentially encompassing all of said sleeves for rotation therewith and supported thereby for frictional contact with such sheet material for support and conveyance thereof, said rubber roller having annular ends, elastomeric end caps with a central bore frictionally journaled on the respective ends of said shaft and abuttingly engages said annular ends of said cylindrical roller and certain ones of said sleeves to seal the ends thereof, said shaft has a pair of locking collars secured thereto, said collars are located between said elastomeric end caps and the outermost annular rings, and an annular seal encompassing each of said collars and frictionally engaging the inner periphery of said certain ones of said sleeves that are engaged by said end caps.

* * * * *